(12) United States Patent
Tanaka et al.

(10) Patent No.: US 11,097,447 B2
(45) Date of Patent: Aug. 24, 2021

(54) METHOD FOR PRODUCING RUBBER MEMBER

(71) Applicant: SUMITOMO RUBBER INDUSTRIES, LTD., Kobe (JP)

(72) Inventors: Tomoo Tanaka, Kobe (JP); Masayuki Sakamoto, Kobe (JP); Takafumi Taguchi, Kobe (JP); Sakae Okubo, Kobe (JP); Takuma Konishi, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 359 days.

(21) Appl. No.: 16/073,407

(22) PCT Filed: Jan. 12, 2017

(86) PCT No.: PCT/JP2017/000900
§ 371 (c)(1),
(2) Date: Jul. 27, 2018

(87) PCT Pub. No.: WO2017/135007
PCT Pub. Date: Aug. 10, 2017

(65) Prior Publication Data
US 2019/0358855 A1 Nov. 28, 2019

(30) Foreign Application Priority Data
Feb. 5, 2016 (JP) .............................. JP2016-021376

(51) Int. Cl.
*B29B 7/00* (2006.01)
*B29B 7/84* (2006.01)
*B29B 7/42* (2006.01)

(52) U.S. Cl.
CPC ................ *B29B 7/84* (2013.01); *B29B 7/422* (2013.01)

(58) Field of Classification Search
CPC .................................. B29B 7/84; B29B 7/422
See application file for complete search history.

(56) References Cited

U.S. PATENT DOCUMENTS

| | | | |
|---|---|---|---|
| 4,573,799 A | 3/1986 | Anders | |
| 5,219,589 A | 6/1993 | Elia et al. | |

(Continued)

FOREIGN PATENT DOCUMENTS

| | | | |
|---|---|---|---|
| CN | 1846971 A | 10/2006 | |
| CN | 102784572 A | 11/2012 | |

(Continued)

OTHER PUBLICATIONS

Chinese Office Action and Search Report, dated Apr. 14, 2020, for Chinese Application No. 201780009542.7, along with an English translation.

(Continued)

*Primary Examiner* — Leith S Shafi
*Assistant Examiner* — Nicholas R Krasnow
(74) *Attorney, Agent, or Firm* — Birch, Stewart, Kolasch & Birch, LLP

(57) ABSTRACT

A method for producing a rubber member according to the present invention includes the steps of: supplying a rubber composition to a cylinder provided in an extruder; extruding the rubber composition to a downstream side of the cylinder while kneading the rubber composition in an internal space of the cylinder that includes a plurality of protruding members protruding from an inner wall surface of the cylinder; compressing the rubber composition at least once in the step of extruding the rubber composition to the downstream side; discharging a gas generated from the compressed rubber composition to outside of the cylinder; discharging, through a discharge outlet of the cylinder, the rubber composition after the gas has been generated; and molding the rubber (Continued)

composition that has been discharged through the discharge outlet into a predetermined rubber member shape.

7 Claims, 3 Drawing Sheets

(56) References Cited

U.S. PATENT DOCUMENTS

| | | | |
|---|---|---|---|
| 9,656,408 B2* | 5/2017 | Fischer | B29C 48/41 |
| 2004/0009076 A1* | 1/2004 | Uphus | B29C 48/687 |
| | | | 417/199.1 |
| 2006/0222727 A1 | 10/2006 | Iwata et al. | |
| 2010/0091603 A1 | 4/2010 | Yamane et al. | |
| 2016/0300969 A1* | 10/2016 | Yamakawa | C09J 183/04 |

FOREIGN PATENT DOCUMENTS

| | | |
|---|---|---|
| EP | 0102400 A1 | 3/1984 |
| EP | 0490360 A1 | 6/1992 |
| JP | 59-64340 A | 4/1984 |
| JP | S62-273821 A | 11/1987 |
| JP | H04-276423 A | 10/1992 |
| JP | H11-77667 A | 3/1999 |
| JP | 2004142383 A * | 5/2004 ........... B29C 48/685 |
| JP | 2004-237715 A | 8/2004 |
| JP | 2008-018581 A | 1/2008 |
| JP | 2008-132672 A | 6/2008 |
| JP | 2008-230060 A | 10/2008 |
| JP | 2010-089423 A | 4/2010 |
| KR | 10-2010-0075211 A | 7/2010 |
| WO | WO 2014/084404 A1 | 6/2014 |

OTHER PUBLICATIONS

Extended European Search Report dated Jul. 17, 2019, for European Patent Application No. 17747169.5.
Japanese Office Action for Japanese Application No. 2016-021376, dated Jan. 21, 2020, with English translation.
International Search Report for PCT/JP2017/000900 (PCT/ISA/210) dated Mar. 21, 2017.
Written Opinion of the International Searching Authority for PCT/JP2017/000900 (PCT/ISA/237) dated Mar. 21, 2017.
Office Action received in Chinese Application No. 201780009542.7 dated Dec. 31, 2020.

* cited by examiner

METHOD FOR PRODUCING RUBBER MEMBER

TECHNICAL FIELD

The present invention relates to a method for producing a rubber member.

BACKGROUND ART

Conventionally, various types of extruders for kneading materials to be kneaded such as a rubber composition and a synthetic resin have been proposed. For example, Patent Literature 1 discloses a so-called pin type extruder. A pin type extruder includes a plurality of protruding pins that are provided on the inner wall surface of a cylinder, and a material to be kneaded can be heated by the pins. The material to be kneaded that has been extruded from such an extruder is caused to pass through an extrusion head including a die plate, and the material is thereby molded into a rubber member having an intended shape.

CITATION LIST

Patent Literature

Patent Literature 1: JP H11-77667 A

SUMMARY OF INVENTION

Technical Problem

However, further improvement is desired for a pin type extruder as described above so as to provide an intended tire performance.

The present invention has been made to solve the problem described above, and it is an object of the present invention to provide a method for producing a rubber member, with which it is possible to prevent a problem caused by a gas generated from a material to be kneaded, and improve productivity.

Solution to Problem

A method for producing a rubber member according to the present invention includes: the steps of: supplying a rubber composition to a cylinder provided in an extruder; extruding the rubber composition to a downstream side of the cylinder while kneading the rubber composition in an internal space of the cylinder that includes a plurality of protruding members protruding from an inner wall surface of the cylinder; compressing the rubber composition at least once in the step of extruding the rubber composition to the downstream side; discharging a gas generated from the compressed rubber composition to outside of the cylinder; discharging, through a discharge outlet of the cylinder, the rubber composition after the gas has been generated; and molding the rubber composition that has been discharged through the discharge outlet into a predetermined rubber member shape.

In the method for producing a rubber member described above, the rubber composition may be caused to pass through a plurality of slits in the step of compressing the rubber composition.

In the method for producing a rubber member described above, the temperature of the rubber composition that has been discharged through the discharge outlet may be set to a low temperature such as, for example, 135° C. or less, 130° C. or less, 125° C. or less, or 120° C. or less.

In the method for producing a rubber member described above, the rubber composition may contain silica in an amount of 40 PHR or more relative to 100 PHR of polymer.

In the method for producing a rubber member described above, the gas generated from the rubber composition may be drawn to the outside of the cylinder by a vacuum pump.

Advantageous Effects of Invention

With the method for producing a rubber member according to the present invention, it is possible to prevent a problem caused by a gas generated from a material to be kneaded, and improve productivity.

DESCRIPTION OF EMBODIMENTS

Figure 1:
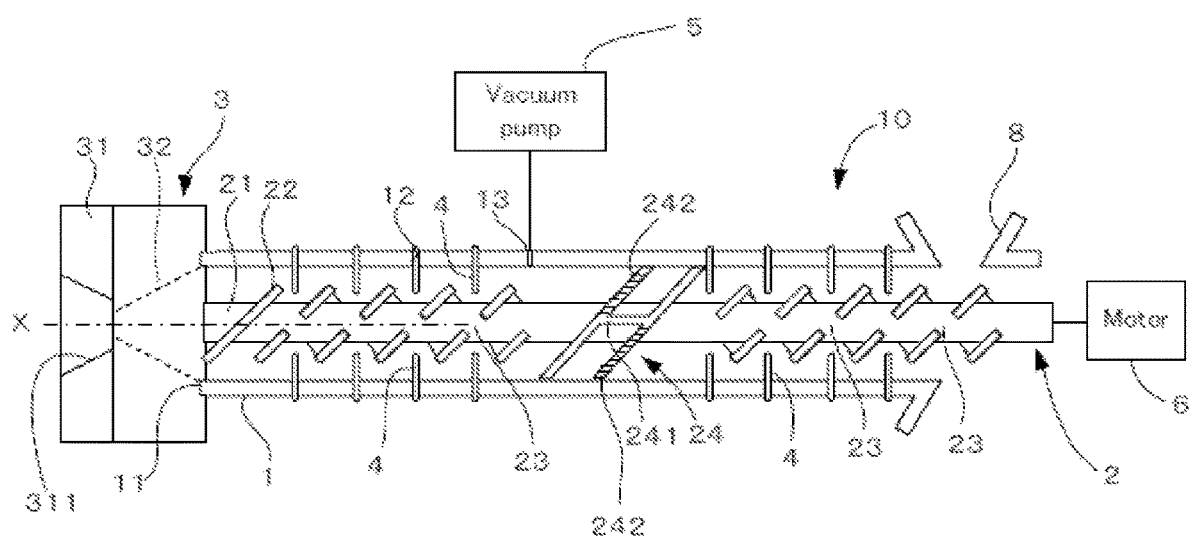
FIG. 1 is a cross sectional view showing one embodiment of an extruder for use in a method for producing a rubber member according to the present invention.
Figure 2:
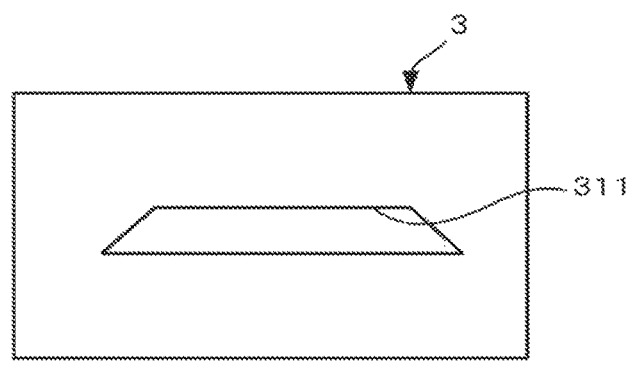
FIG. 2 is a front view of an extrusion head provided on the extruder shown in FIG. 1.

Hereinafter, a description will be given of an embodiment in which a method for producing a rubber member according to the present invention is applied as a tire tread production method, with reference to the drawings. FIG. 1 is a cross sectional view schematically showing an extruder 10 and an extrusion head 3 used in the production method, and FIG. 2 is a front view of the extrusion head.

1. Structure of Extruder

As shown in FIG. 1, the extruder 10 of the present embodiment is an apparatus that receives a supply of a rubber composition such as raw rubber, and kneads and extrudes the rubber composition. As shown in FIG. 1, the extruder includes a cylindrical cylinder 1, and a screw 2 that is rotated within the cylinder 1. The cylinder 1 includes a discharge outlet 11 for discharging the kneaded rubber at a first end portion located on the left side in FIG. 1, and a motor 6 for rotating the screw 2 at a second end portion located on the right side in FIG. 1. The inner diameter of the discharge outlet 11 is adjusted according to requirements. In the present embodiment, the discharge outlet 11 has a small inner diameter.

Also, in the cylinder 1, a hopper (supply portion) 8 for supplying the rubber composition is attached on the upper surface of the second end portion. The hopper 8 is in communication with the internal space of the cylinder 1. Furthermore, the cylinder 1 has a plurality of through holes 12 that are formed at predetermined intervals along the axial direction and equidistantly along the circumferential direction. Each through hole 12 communicates between the inside and the outside of the cylinder 1. To some of the through holes 12, pins (protruding members) 4 that protrude toward the internal space of the cylinder 1 are detachably attached. Each pin 4 has a cylindrical shape, and extends toward an axis X of the cylinder 1 to a position close to a shaft 21 of the screw 2, which will be described later.

Next, a description will be given of the screw 2. The screw 2 includes a shaft 21 that extends along the axis X of the cylinder 1, and a screw thread 22 provided around the outer circumferential surface of the shaft 21. The screw thread 22 has a uniform pitch over the length, but is not continuous, or in other words, the screw thread 22 is disconnected at predetermined intervals along the axial direction. In short, the shaft 21 includes interstitial regions (gap portions) 23, in which the screw thread 22 is not formed, at predetermined intervals along the axial direction. The through holes 12 of the cylinder 1 are positioned such that each pin 4 described above extends toward the corresponding one of the interstitial regions 23. Instead of completely disconnecting the screw thread 22, gaps having a predetermined depth may be formed on the outer circumferential surface of the screw thread 22 so as to prevent interference with the pins 4. Also, the lengths of the pins 4 may be changed as appropriate.

A compressing portion 24 for compressing the rubber composition is provided in an intermediate portion of the screw 2, or in other words, between the hopper 8 and the discharge outlet 11. The compressing portion 24 has the following configuration. In an approximately 360° portion of the screw thread 22 that corresponds to the compressing portion 24, the outer diameter of the screw thread 22 is larger than that of the other portion such that the approximately 360° portion extends close to the inner wall surface of the cylinder 1. To be more specific, for example, a clearance of about several millimeters may be formed so that the space between the outer circumferential surface of the screw thread 22 and the inner wall surface of the cylinder 1 are sealed by the rubber composition.

Also, the compressing portion 24 includes a dam portion 241 that extends in the axial direction so as to connect adjacent threads of the screw thread 22. The dam portion 241 is formed such that the height from the shaft 21 is the same as that of the screw thread 22. With this configuration, the rubber composition passing through the screw thread 22 is prevented from flowing by the dam portion 241, and thus is not transferred to the downstream side. However, in the compressing portion 24, a plurality of fine grooves 242 extending in the axial direction are formed at predetermined intervals around approximately 360° on the outer circumferential surface of the screw thread 22 so as to connect the leading and trailing end portions of the dam portion 241. Accordingly, the rubber composition prevented from flowing by the dam portion is transferred to the downstream side of the cylinder 1 via the grooves 242.

A portion of the cylinder 1 that corresponds to the compressing portion 24 of the screw thread 22 includes no pin 4. That is, the through holes 12 are simply closed without providing pins 4 to the through holes 12. Also, on the downstream side of the compressing portion 24, one of the through holes of the cylinder 1 that is closest to the compressing portion 24 is not provided with a pin 4, and instead, a vacuum pump 5, which is provided outside the cylinder 1, is connected to the through hole. That is, as will be described later, this through hole constitutes an air vent 13, and functions to discharge water, air and the like that are contained in the rubber composition. All of the through holes 12 located on the downstream side of the air vent 13 and the through holes 12 located on the upstream side of the compressing portion 24 are provided with pins 4. These pins 4 extend toward the interstitial regions 23 of the screw thread 22.

2. Structure of Extrusion Head

Next, a description will be given of the extrusion head with reference to FIG. 2. The extrusion head 3 is attached to the discharge outlet 11 of the extruder 10, and a die plate 31 is provided at the leading end. As shown in FIG. 2, the die plate 31 has an opening portion 311 that has a cross sectional shape of a tread that needs to be molded. Also, in the extrusion head 3, a preformer 32 is provided in a path extending from the discharge outlet 11 of the extruder 10 to the die plate 31, and the rubber composition is preformed.

3. Rubber Composition

As the rubber composition that can be used in the present embodiment, it is possible to use a silica-rich rubber that has a high silica content. Such a silica-rich rubber can enhance wet grip performance, and exhibit excellent actual running performance such as reducing heat generation and rolling resistance.

Examples of rubber polymers include natural rubber (NR), butadiene rubber (BR), styrene butadiene rubber (SBR), polyisoprene rubber (IR), nitrile rubber (NBR), chloroprene rubber (CR), and the like. These may be used singly, or two or more thereof may be blended.

There is no particular limitation on silica that is contained in the rubber composition, but in order to enhance the rubber reinforcing effect and rubber processability, it is preferable to use silica that has a nitrogen absorption specific surface area (BET) of 150 to 250 $m^2/g$, and exhibits colloidal properties with a dibutyl phthalate (DBP) oil absorption of 180 ml/100 g or more.

Preferred examples of silane coupling agents include bis(triethoxysilylpropyl)tetrasulfide, and α-mercaptopropyl trimethoxysilane. In order to achieve both high levels of low rolling resistance properties and wet grip properties, the amount of silica is preferably 40 PHR or more, and more preferably 50 PHR or more relative to 100 PHR of polymer.

4. Operations of Extruder and Extrusion Head

Next, a description will be given of the operations of the extruder configured as described above. First, the motor is driven to rotate the screw 2. In addition, the vacuum pump 5 is also driven. Next, the rubber composition is fed from the hopper 8. The fed rubber composition is transferred to the downstream side by rotation of the screw 2. At this time, a shearing force is applied to the rubber composition by the pins 4 while the rubber composition passes through the screw thread 22, and thus the rubber composition is heated by friction. Then, the rubber composition that has reached the compressing portion 24 is prevented from flowing by the dam portion 241, and thus cannot be transferred to the downstream side through the screw thread 22. Accordingly, the rubber composition is transferred to the downstream side through the grooves 242 formed on the outer circumferential surface of the screw thread 22. At this time, because the grooves 242 are formed around approximately 360 degrees on the outer circumferential surface of the screw thread 22, the rubber composition passing through the grooves 242 is transferred to the downstream side while the rubber composition is formed into a cylindrical shape.

Then, the rubber composition increases its surface area by passing through the fine grooves 242, and generates more heat to vaporize water, some of the components, and the like contained in the rubber composition. By increasing the surface area in the manner described above, water and the like contained in the rubber composition are easily discharged to the rubber surface. The components vaporized in this way are drawn by the vacuum pump 5 on the downstream side of the compressing portion 24, and discharged to the outside of the cylinder 1 via the air vent 13. Then, the rubber composition from which water, some of the components and like have been vaporized is transferred to further downstream side by the screw 2, and discharged through the discharge outlet 11. During this process, the rubber composition is heated by the pins 4 even on the downstream side of the compressing portion 24.

The rubber composition that has been discharged from the extruder in the manner described above is preformed into a strip shape while passing through the preformer 32 of the extrusion head 3. After that, the rubber composition passes through the opening portion 311 of the die plate 31, and is thereby formed into the shape of a tread.

5. Feature

As described above, according to the present embodiment, because the extruder 10 includes the air vent 13, the gas generated from the rubber composition heated by the compressing portion 24 can be discharged to the outside of the cylinder 1. Accordingly, it is possible to prevent the gas from being contained in the rubber composition to be kneaded. As a result, the molded tread can be formed into an intended shape.

It is also possible to prevent the gas from inhibiting a reaction between rubber and silica, and appropriately disperse silica. It is thereby possible to improve the tire performance such as wet performance and rolling resistance. The same applies to an agent other than silica.

In addition, it is unnecessary to drive the extruder at a low temperature so as to not generate a gas. For this reason, the rotation rate of the screw 2 can be increased. As a result, productivity can be improved.

In addition, because a plurality of pins 4 are provided on the inner wall surface of the cylinder 1, it is unnecessary to reduce the pitch in a portion of the screw thread for heat generation, as in, for example, a vent type extruder. Accordingly, it is possible to increase the pitch of the screw thread 22, and thereby increase the discharge amount.

Also, in the extruder of the present embodiment, a cylinder as used in a conventional pin type extruder can be used. This configuration has the following advantage. Specifically, a cylinder for an ordinary pin type extruder includes through holes for attaching pins that are formed in advance, and thus pins can be detachably attached to the through holes. Accordingly, by using a cylinder as described above, the number of pins can be changed as appropriate according to, for example, the amount of heat required for the rubber composition. That is, pins can be attached to all of the through holes. Alternatively, pins can be attached to some of the through holes. In the case where pins are not provided, the through holes can be closed by using caps or the like.

Depending on the type of rubber composition, a portion of the rubber composition may be discharged through the air vent 13. In this case, the position of the air vent 13 can be changed as appropriate. That is, the through hole used as the air vent 13 can be changed.

Furthermore, the position of the compressing portion 24 can be changed according to the type of rubber composition. For example, a plurality of screws 2 including compressing portions 24 at different positions can be used selectively according to the type of rubber composition. In this case, in the cylinder 1, no pin 4 is provided at the position where a compressing portion 24 is disposed, but the position where no pin 4 is provided can be easily changed depending on the screw 2.

As described above, by using a cylinder in which a plurality of through holes are formed in advance, such as a cylinder for use in a pin type extruder, not only the positions of the pins, but also the position of the air vent can be changed as appropriate.

6. Variations

Although one embodiment of the present invention has been described above, the present invention is not limited to the embodiment given above. Accordingly, various modifications can be made without departing from the scope of the present invention. Variations given below can be combined as appropriate.

Variation 6-1

In the embodiment given above, the screw thread 22 has a uniform pitch in the axis direction over the entire length, but the pitch may partially be changed according to the type of rubber composition or the like as long as the discharge amount is not reduced significantly.

Variation 6-2

In the embodiment given above, one compressing portion 24 is provided, but it is also possible to provide two or more compressing portions 24. In this case, an air vent can be provided on the downstream side of each compressing portion 24. With this configuration, degassing from the rubber composition can be performed a plurality of times. Also, there is no particular limitation on the number of air vents 13, and it is possible to provide a plurality of air vents 13. Also, any type of pump other than a vacuum pump can be used to draw a gas through the air vent as long as the gas can be drawn.

Variation 6-3

Figure 3:
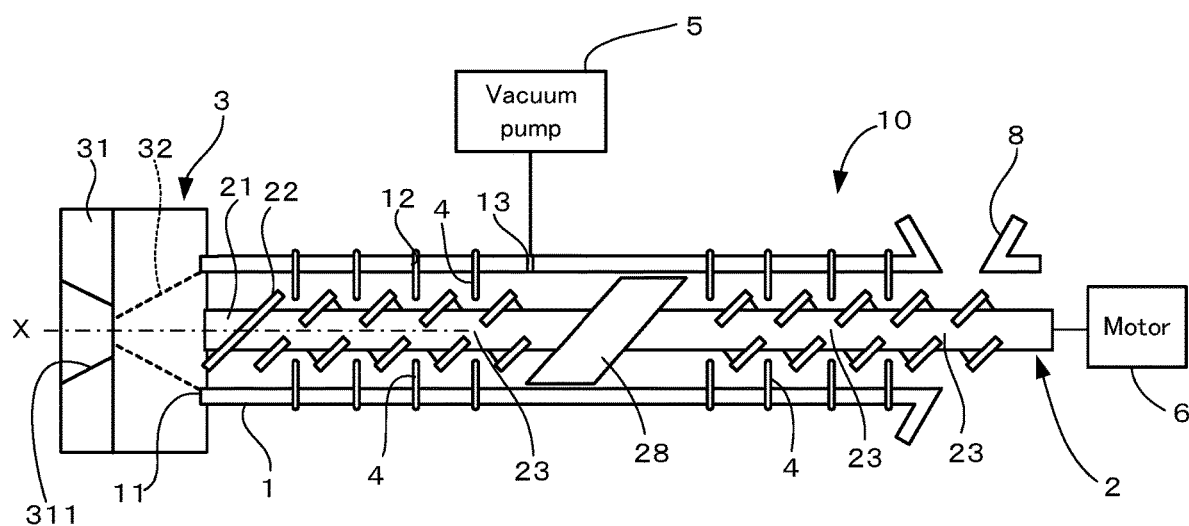
FIG. 3 is a cross sectional view showing another example of the extruder shown in FIG. 1.

The configuration of the compressing portion 24 is not limited to that shown in the embodiment given above, and may be any configuration as long as it is possible to compress the rubber composition so as to cause the rubber composition to generate heat while the rubber composition passes through the compressing portion 24. For example, as shown in FIG. 3, a compressing portion 28 that has a diameter larger than that of the shaft 21 may be provided, instead of the compressing portion 24 shown in FIG. 1. The compressing portion 28 has a cylindrical shape having a predetermined length in the axial direction, and includes a small clearance between the inner wall surface of the cylinder 1 and the compressing portion 28. Also, the compressing portion 28 is inclined in the same manner as the screw thread 22. Even when this compressing portion 28 is used, the rubber composition supplied from the upstream side passes through the compressing portion 28 while being compressed between the compressing portion 28 and the inner wall surface of the cylinder 1, and water and the like contained in the rubber composition can be vaporized.

Variation 6-4

Figure 4:
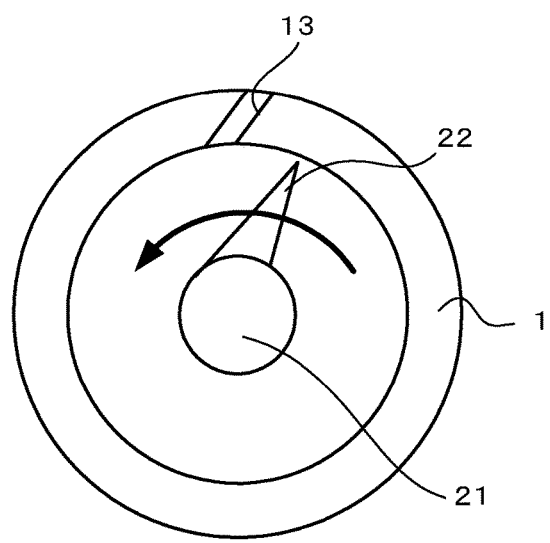
FIG. 4 is a cross sectional view of the extruder shown in FIG. 1.

The cylinder 1 can be configured in various configurations. For example, as shown in FIG. 4, the air vent may be inclined in a direction away from the rotation direction of the screw. With this configuration, it is possible to prevent the air vent from being clogged by the rubber composition.

Variation 6-5

Also, in the embodiment given above, an embodiment was shown in which a cylinder as used in a pin type extruder is used. However, it is also possible to use a cylinder in which pins are attached directly to the inner wall surface of the cylinder without forming through holes in the cylinder, or the cylinder additionally configured such that air vents are appropriately provided at positions as needed. Also, there is no particular limitation on the shape of the pins.

Variation 6-6

In the embodiment given above, a case has been described in which the rubber composition is kneaded and extruded so as to mold a tread, but the embodiment can be applied to the production of treads of various forms by changing the extrusion head as appropriate. The embodiment can also be applied to the production of tire components other than treads, as well as various types of rubber members.

Example

Hereinafter, an example of the present invention will be described. However, it is to be noted that the present invention is not limited to the following example.

1. Extruder and Extrusion Head

Figure 5:
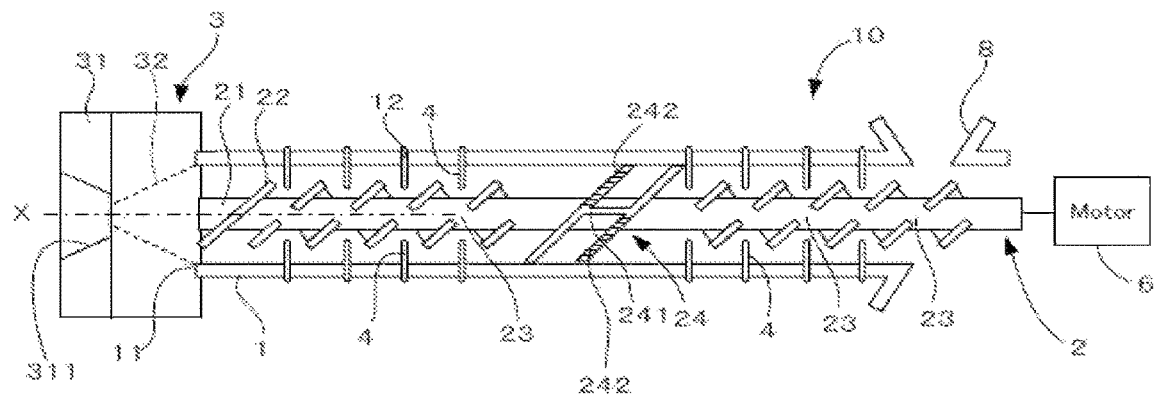
FIG. 5 is a cross sectional view of an extruder of a comparative example.

In order to carry out a method of an example of the present invention, an extruder and an extrusion head as shown in FIG. 1 described in the embodiment given above were prepared. Also, as a comparative example, the following apparatus was used. To be specific, an extruder as shown in FIG. 5 obtained by omitting the vacuum pump and closing the through hole of the cylinder used as the air vent in the extruder of the example of the present invention was used, and a method using this extruder was defined as comparative example. The specifications of the extruders were as follows.

Figure 6:
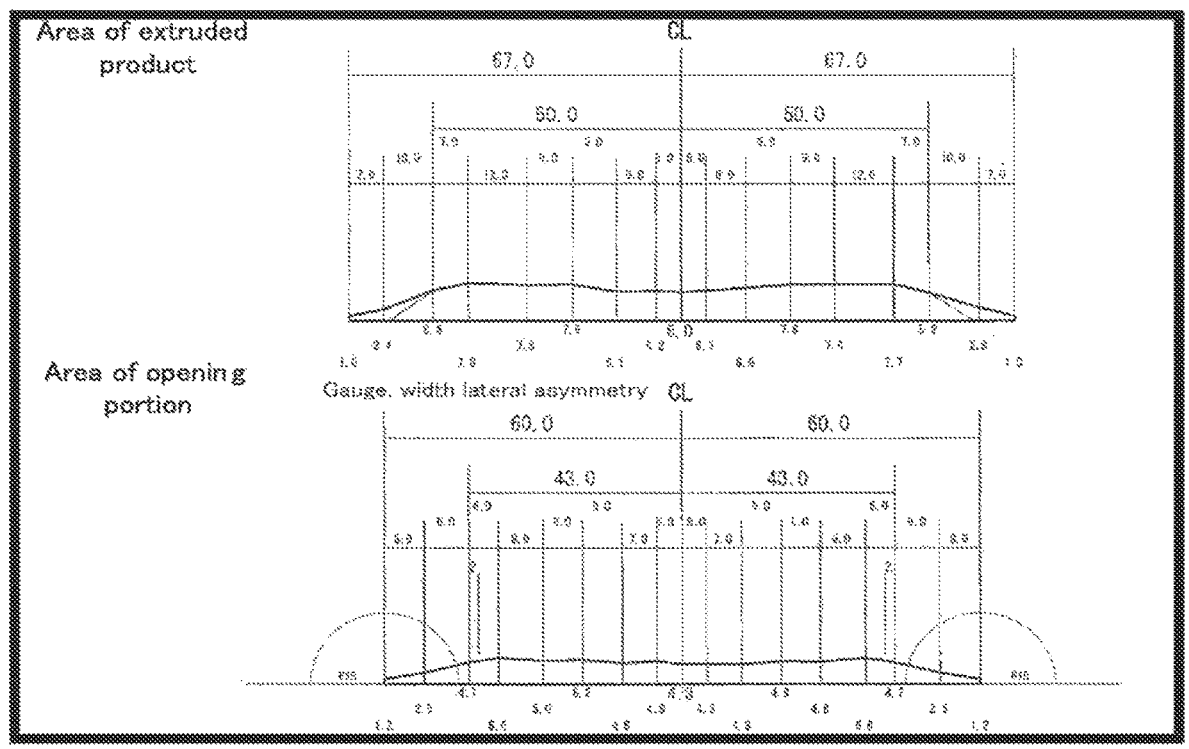
FIG. 6 is a diagram showing the shape of an opening portion of an extruder of an example of the present invention, and the shape of an extruded product obtained by the extruder.

Diameter: 90 mm
L/D (the ratio of screw length L to screw diameter): 12
Temperature adjustment (extrusion head, screw, cylinder): 90° C., 80° C., 60° C.
Die factor (cross sectional area of opening portion of die plate (mm$^2$)/cross sectional area of extruded product (mm$^2$)×100):62.5% (the specific shape is as shown in FIG. 6)

2. Rubber Composition

Formulation: tread formulation with 55 PHR of silica
Silica dispersion in kneaded rubber: 95.2%

3. Production and Evaluation of Treads

The rubber composition described above was molded into one hundred tire treads by using the extruder and extrusion head of the example and the extruder and extrusion head of the comparative example. At this time, measurement was performed on the following items by changing the rotation speeds of the screw.

Discharge temperature

Surface temperature was measured for each a molded tread by using a thermosensor, and the highest surface temperature was defined as discharge temperature.

Occurrence (%) of treads having a non-compliant shape

The occurrence of threads that have a non-compliant shape was calculated by the following expression:

Number of treads with a deviation from the specifications by ±0.5 mm at each point/one hundred treads×100.

Tire performance (wet performance: tan δ at 0° C.)

Tan δ at 0° C. was measured by using an analyzer RPA 2000 available from Alpha Technologies, Ltd. A kneaded rubber had a tan δ at 0° C. of 0.73.

Rolling performance (RRC: tan δ at 30° C.)

Tan δ at 30° C. was measured by using an analyzer RPA 2000 available from Alpha Technologies, Ltd. A kneaded rubber had a tan δ at 30° C. of 0.33.

Bubble area ratio (%)

The bubble area ratio was calculated by the following expression:

Recessed area (mm$^2$)/cross sectional area of extruded product (mm$^2$).

This was obtained based on 3D analysis using a microscope. When the bubble area ratio is, for example, 2% or more, the shape is not stabilized, and thus a problem occurs in the tire performance.

The results are as shown below. Table 1 shows the results of the method of the example of the present invention, and Table 2 shows the results of the method of the comparative example.

TABLE 1

| Rotation speed (rpm) | Discharge temperature (° C.) | Occurrence of treads with non-compliant shape (%) | Silica dispersion (%) | Wet performance Tan δ at 0° C. | RRC Tan δ at 30° C. | Bubble area ratio (%) |
|---|---|---|---|---|---|---|
| 10 | 100 | 0 | 96.2 | 0.75 | 0.31 | 0 |
| 20 | 108 | 0 | 97.0 | 0.74 | 0.31 | 0 |
| 30 | 114 | 0 | 96.4 | 0.75 | 0.30 | 0 |
| 40 | 122 | 0 | 96.5 | 0.75 | 0.30 | 0 |
| 50 | 130 | 0 | 96.3 | 0.75 | 0.31 | 0 |
| 60 | 135 | 0 | 96.7 | 0.74 | 0.31 | 0.1 |

TABLE 2

| Rotation speed (rpm) | Discharge temperature (° C.) | Occurrence of treads with non-compliant shape (%) | Silica dispersion (%) | Wet performance Tan δ at 0° C. | RRC Tan δ at 30° C. | Bubble area ratio (%) |
|---|---|---|---|---|---|---|
| 10 | 100 | 0 | 95.0 | 0.73 | 0.32 | 0 |
| 20 | 108 | 0 | 95.5 | 0.74 | 0.35 | 0 |
| 30 | 114 | 0 | 94.9 | 0.70 | 0.35 | 0.8 |
| 40 | 122 | 10 | 95.5 | 0.70 | 0.33 | 2.8 |
| 50 | 130 | 80 | 94.2 | 0.69 | 0.34 | 3.5 |
| 60 | 135 | 98 | 95.0 | 0.68 | 0.33 | 3.5 |

It can be seen from the above results that in the method of the comparative example, the wet performance and the RCC evaluation are lower than those of the method of the example of the present invention. It is found that, when the rotation speed of the screw is 30 rpm or higher, the bubble area ratio deteriorates. Furthermore, it is also found that when the rotation speed of the screw is 40 rpm or higher, a problem occurs in shape. In particular, when the rotation speed of the screw was 50 rpm or higher, a problem occurred inmost of the treads. Also, with the method of the comparative example, at a rotation speed of 30 rpm or lower, a problem did not occur in shape, but productivity lowered at a rotation speed of 30 rpm or lower. On the other hand, with the method of the example of the present invention, the rolling performance was high because the wet performance was higher, and RRC was lower than those of the comparative example. That is, the performance evaluations were higher and stabler than those of the comparative example. Even when the rotation speed of the screw increased, the bubble area ratio was almost 0%. Also, no problem occurred in shape at any rotation speed. It is therefore clear that with the method of the example of the present invention, the molded treads have a higher level of performance than those produced by the method of the comparative example, and higher productivity is obtained as compared with the method of the comparative example.

LIST OF REFERENCE NUMERALS

1 Cylinder
11 Discharge outlet
12 Through hole
13 Air vent
2 Screw
242 Groove
4 Pin (protruding member)

The invention claimed is:

1. A method for producing a rubber member, the method comprising the steps of:
supplying a rubber composition to a cylinder provided in an extruder;
extruding the rubber composition to a downstream side of the cylinder by a screw at a rotation speed of 30 rpm or higher while kneading the rubber composition in an internal space of the cylinder that includes a plurality of protruding members protruding from an inner wall surface of the cylinder;
compressing the rubber composition at least once in the step of extruding the rubber composition to the downstream side;
discharging a gas generated from the compressed rubber composition to outside of the cylinder;
discharging, through a discharge outlet of the cylinder, the rubber composition at 135° C. or less after the gas has been generated; and
molding the rubber composition that has been discharged through the discharge outlet into a tire tread shape.

2. The method for producing a rubber member according to claim 1,
wherein the rubber composition is caused to pass through a plurality of slits in the step of compressing the rubber composition.

3. The method for producing a rubber member according to claim 1,
wherein the rubber composition contains silica in an amount of 40 PHR or more relative to 100 PHR of polymer.

4. The method for producing a rubber member according to claim 1,
wherein the gas generated from the rubber composition is drawn to the outside of the cylinder by a vacuum pump.

5. The method for producing a rubber member according to claim 2,
wherein the rubber composition contains silica in an amount of 40 PHR or more relative to 100 PHR of polymer.

6. The method for producing a rubber member according to claim 2,
wherein the gas generated from the rubber composition is drawn to the outside of the cylinder by a vacuum pump.

7. The method for producing a rubber member according to claim 3,
wherein the gas generated from the rubber composition is drawn to the outside of the cylinder by a vacuum pump.

* * * * *